United States Patent
Zhu

(10) Patent No.: US 8,386,386 B1
(45) Date of Patent: Feb. 26, 2013

(54) PHONE USAGE PATTERN AS CREDIT CARD FRAUD DETECTION TRIGGER

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/371,072

(22) Filed: Feb. 10, 2012

Related U.S. Application Data

(63) Continuation of application No. 12/348,378, filed on Jan. 5, 2009, now Pat. No. 8,145,561.

(51) Int. Cl.
*G06Q 40/00* (2012.01)

(52) U.S. Cl. .......... 705/44; 379/111; 455/406; 455/407; 705/16

(58) Field of Classification Search .................... 705/44, 705/16; 455/406, 407; 379/111, 112.01
See application file for complete search history.

(56) References Cited

U.S. PATENT DOCUMENTS

| | | | |
|---|---|---|---|
| 5,627,886 A * | 5/1997 | Bowman | 379/111 |
| 7,376,431 B2 | 5/2008 | Niedermeyer | |
| 8,145,561 B1 | 3/2012 | Zhu | |
| 2001/0051920 A1 | 12/2001 | Joao et al. | |
| 2006/0046689 A1* | 3/2006 | Kim | 455/406 |
| 2008/0120190 A1* | 5/2008 | Joao et al. | 705/16 |
| 2008/0310608 A1* | 12/2008 | Johnson et al. | 379/112.01 |
| 2009/0068982 A1* | 3/2009 | Chen et al. | 455/407 |
| 2009/0112765 A1* | 4/2009 | Skowronek | 705/44 |
| 2009/0163173 A1 | 6/2009 | Williams | |

\* cited by examiner

*Primary Examiner* — Samica L Norman

(57) ABSTRACT

A credit card fraud reduction system is disclosed. The system comprises a computer system and an application. The application, when executed on the computer system, applies increased credit card fraud prevention procedures to use of an electronic credit card application in a mobile electronic device, based on a changed communication usage pattern of the mobile electronic device.

20 Claims, 6 Drawing Sheets

PHONE USAGE PATTERN AS CREDIT CARD FRAUD DETECTION TRIGGER

CROSS-REFERENCE TO RELATED APPLICATIONS

This application is a continuation of and claims priority to U.S. patent application Ser. No. 12/348,378, entitled "Phone Usage Pattern as Credit Card Fraud Detection Trigger", filed on Jan. 5, 2009, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fraudulent use of credit cards can cause a significant waste of resources for credit card companies. To help control expenses, credit card companies currently employ various methods to detect credit card fraud based on historical usage patterns of an individual consumer's credit card as well as other predictive triggers. For example, if a cardholder normally uses a credit card for purchases within their hometown and then a large overseas purchase is charged to the card, the credit card company may investigate the transaction and contact the cardholder for verification. Also, a red flag may alert the credit card company if the cardholder normally uses the credit card for small purchases such as gas and groceries and then a series of unusually large charges at electronics stores begin to appear. The credit card company can choose to take action or to keep monitoring the credit card activity for further anomalies. Currently, credit card capabilities may enable users to make credit card purchases via a mobile electronic device (e.g., mobile phone), wherein the credit card information may be stored on a secure element in the mobile electronic device.

SUMMARY

In an embodiment, a credit card fraud reduction system is provided. The system comprises a computer system and an application. The application, when executed on the computer system, applies increased credit card fraud prevention procedures to use of an electronic credit card application in a mobile electronic device, based on a changed communication usage pattern of the mobile electronic device.

In another embodiment, a method of reducing credit card fraud is provided. The method comprises determining a communication usage pattern of a mobile electronic device, wherein the mobile electronic device contains an electronic credit card application. The method also comprises identifying a trigger event, wherein communication from the mobile electronic device deviates from the communication usage pattern. The method also comprises responding to the trigger event by increasing authentication procedures to complete payment transactions using the electronic credit card application on the mobile electronic device.

In another embodiment, a method of discrete identity theft prevention is provided. The method comprises determining a usage pattern of a mobile phone that contains an electronic credit card application, wherein the usage pattern is based on voice communications and data communications. The method also comprises identifying a mobile phone communication that deviates from the usage pattern of the mobile phone and in response to a usage pattern deviation, transmitting an authentication request to the mobile phone. The method also comprises the mobile phone prompting for input of a security code in response to the authentication request.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
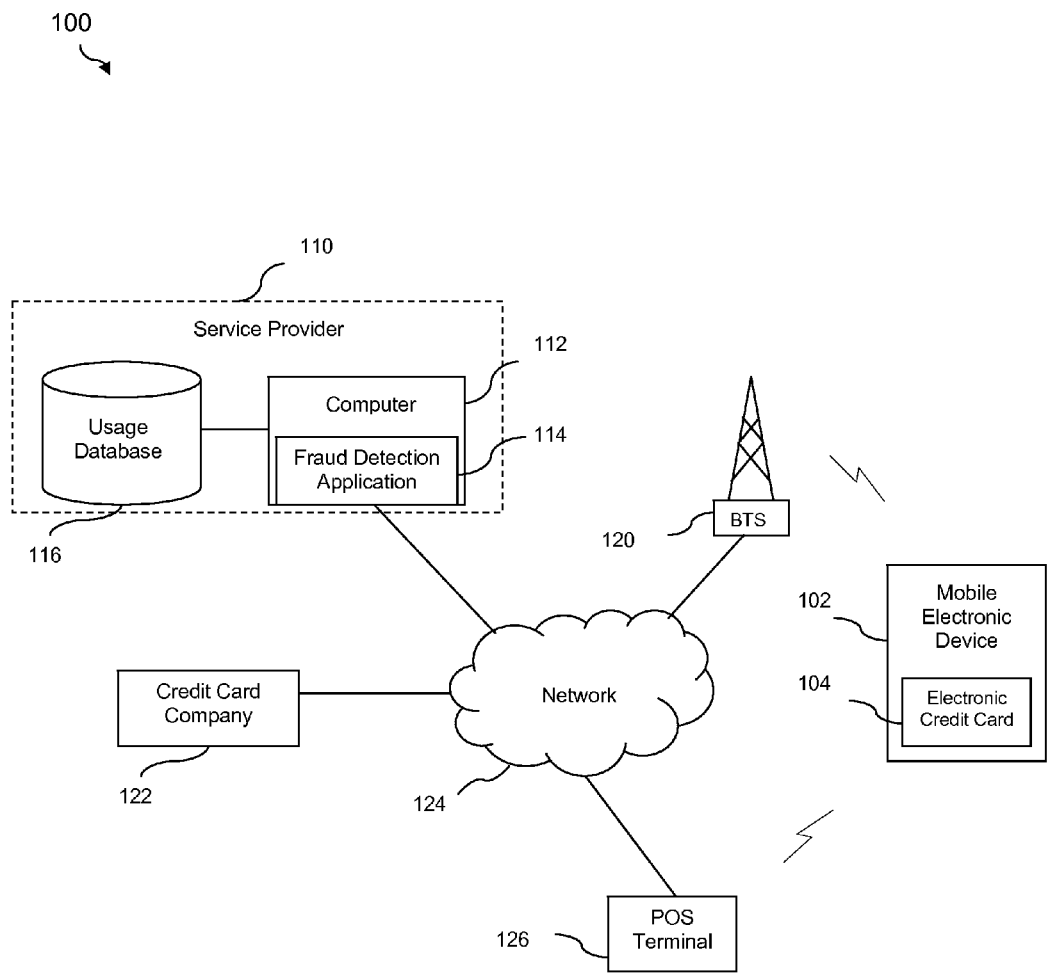
FIG. 1 illustrates an electronic credit card fraud reduction system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A fraud detection system for an electronic credit card stored on a mobile electronic device is disclosed. In an embodiment, a fraud detection application within a computer system at a service provider may attempt to identify credit card fraud based on changes in communication usage patterns of the mobile electronic device (e.g., mobile phone, personal digital assistant, laptop computer). For example, when a significant change in communication usage is detected, heightened electronic credit card security measures may go into effect which may either prevent use of the mobile electronic device or may require some form of identity verification at a point-of-sale terminal. In the event that an unauthorized user attempts to make purchases with the electronic credit card, the heightened security procedures may prevent a fraudulent purchase and may alert the credit card company, the service provider, and/or the owner of the mobile electronic device of the unauthorized purchase attempt. In an embodiment, when a change in communication usage pattern is identified, a message may be transmitted to the mobile electronic device to request that the user enter some authentication information and/or token. This approach may be used to avoid the inconvenience or embarrassment that may be caused to a user by being asked to provide a personal identification number and/or a photo identification card during a payment transaction.

The above-mentioned changes in communication usage patterns could be an unusual number of phone calls from a distant location or it could be a surge or sudden drop in text messages or browsed universal reference locators (URLs). Before a pattern of communication usage can be established, the service provider may need to monitor usage over a period of time to determine what activity constitutes a deviation in usage. For example, a communication pattern could be the phone numbers normally called, the times of day that the numbers are called, the location that the numbers are usually called from, the average number of calls per unit of time, the average length of each call, the average number of incoming/outgoing data packets per unit of time, and/or the average amount of time the mobile electronic device is out of network coverage. The communication usage information collected by the service provider over a period of time can be stored in a usage database and ultimately used for communication analysis.

In an embodiment, depending on the alert parameters set up by the service provider and the credit card company, a change in the communication usage pattern of the mobile electronic device may trigger the fraud detection application to either disallow the use of the electronic credit card at the point-of-sale or it may require the user to verify ownership. For example, if over a period of 6 months, the user normally uses their mobile phone in their hometown to make local calls and then a self locating device within the mobile phone detects that the phone is in another state, any purchases attempted by the electronic credit card on the mobile phone may either be disallowed or may require the user to present a photo identification or to enter a personal identification number. Likewise, if over a period of 6 months, the user normally uses their mobile phone for a specific one or two services and then the phone is repeatedly used to access different services, any purchases attempted by the electronic credit card on the mobile phone may either be disallowed or may require the user to present a photo identification or to enter a personal identification number.

In another embodiment, the fraud detection application at the service provider may take pro-active measures to circumvent future fraudulent purchases or to prevent an embarrassing situation for the customer at the point-of-sale (e.g., a restaurant, a store). For example, if the user normally makes short phone calls to a few local numbers, and then the mobile phone is being used to make a series of long overseas calls, the service provider may choose to alert the customer of the deviation in usage patterns before a purchase is attempted with the electronic credit card. The alert may be in the form of a phone call, wherein the user may be requested to verify their identity by answering a confidential question (e.g., mother's maiden name). Alternatively, the alert may be in the form of a text message, wherein the user may be required to enter a security code on the mobile electronic device. If the user is unable to verify ownership by correctly answering a confidential question or by entering a correct code, the service provider may disable the use of the mobile electronic device or the electronic credit card application until ownership can be verified.

To prevent unnecessary alerts or problems in using the electronic credit card application on the mobile electronic device, the user can send a notification to the service provider of an anticipated change in locations for a specified amount of time. The service provider can then determine if any subsequent credit card transactions are within the vicinity of the location specified by the user. In addition, the fraud detection application may be able to determine that a sequence of purchases in an unusual location is permissible. For example, if the mobile electronic device is used to make a plurality of calls to New York, then the electronic credit card is used to purchase a plane ticket to New York, any subsequent purchases made by the electronic credit card in New York or phone calls made from the mobile electronic device in New York may be allowed without an alert or a hold.

In an embodiment, the fraud detection application executing on the computer system of the service provider may provide alerts and/or usage pattern data to credit card issuers and/or financial institutions. The credit card issuers and/or financial institutions may use the information to heighten security checks provided by the credit card issuers and/or financial institutions. This information may be used by the credit card issuers and/or financial institutions to trigger heightened restrictions or as a weighting factor to adjust and/or adapt financial security algorithms and/or programs.

Turning now to FIG. 1, a system 100 for reducing credit card fraud is described. The system 100 comprises a mobile electronic device 102, an electronic credit card 104, a service provider 110, a computer 112, a fraud detection application 114, a usage database 116, a base transceiver station 120, a credit card company 122, a network 124, and a point-of-sale terminal 126. The mobile electronic device 102 can communicate wirelessly through the base transceiver station 120 and the network 124 to the credit card company 122 and the service provider 110 and may be implemented as a mobile phone, a personal digital assistant, or other mobile electronic device having wireless communication capability. A mobile phone is discussed in detail hereinafter.

The electronic credit card application 104 may be stored in a secure element on the mobile electronic device 102 and may be used as a credit card to purchase goods and services via near field communications with the point-of-sale terminal 126. The service provider 110 contains the fraud detection application 114 in the computer 112 that communicates with the usage database 116 to analyze communication records to identify deviations in communication usage patterns. The computer 112 may be implemented as a general purpose computer system. General purpose computers are discussed in detail hereinafter. The credit card company 122 may obtain the data accumulated by the service provider 110, and use the information to monitor credit card activity and to help prevent fraudulent purchases.

In an embodiment, the service provider 110 may contain a usage database 116 that stores communication usage information recorded from the mobile electronic device 102 over a period of time. The fraud detection application 114 in the computer 112 may analyze the usage information stored in the database 116 to determine communication usage patterns. In an embodiment, the fraud detection application 114 analyzes the usage information on a periodic basis, for example about once an hour, about once every four hours, about once a day, or on some other periodic interval. Usage patterns may include the phone numbers regularly called, the times of day the numbers are called, the location that the numbers are usually called from, the average number of calls per unit of time, the average length of each call, the average number of incoming/outgoing data packets per unit of time, and/or the average amount of time the mobile electronic device 102 is out of network coverage.

If the fraud detection application 114 detects a significant deviation in a communication pattern, fraud prevention procedures may be increased by the service provider 110 and/or the credit card company 122. Examples of a deviation in a communication pattern could be when the number of calls or data packets rises above a first pre-defined threshold or drops below a second pre-defined threshold number of calls or data packets per unit of time, when the length of a call is longer or shorter than a pre-defined normal range, and/or a call that originates from a non-customary location.

As an example of increasing fraud prevention procedures, when the fraud detection application 114 detects a deviation in communication patterns (e.g., the mobile electronic device 102 is being used to make calls to a series of numbers never previously called) and the electronic credit card 104 is used to make a credit card purchase, the user of the mobile electronic device 102 may be required to present a photo identification or enter a personal identification number at the point-of-sale terminal 126. In another example of fraud prevention, if the fraud detection application 114 detects a deviation in communication patterns (e.g., a self location device on the phone determines that the phone is in another state), a text message or a voice message may be sent to the mobile electronic device 102 which summarizes the usage pattern deviation. The user may be required to enter a security code or answer a security question (e.g., mother's maiden name) to verify ownership of the mobile electronic device 102.

By sending an alert to the user before any purchases are made, the user can handle any security issues before making a credit card payment so as to avoid any embarrassing situations such as having to present authenticating information or having a card rejected in a restaurant or a store. In an embodiment, the fraud detection application 114 may determine that increased authentication procedures are needed and notify the credit card company 122 and/or send the message to the mobile electronic device 102. In another embodiment, however, the fraud detection application 114 may send a summary of communication usage by the mobile electronic device 102 to the credit card company 122, and the credit card company 122 may process this information to determine that increased authentication procedures are needed and/or send the message to the mobile electronic device 122.

Figure 2:
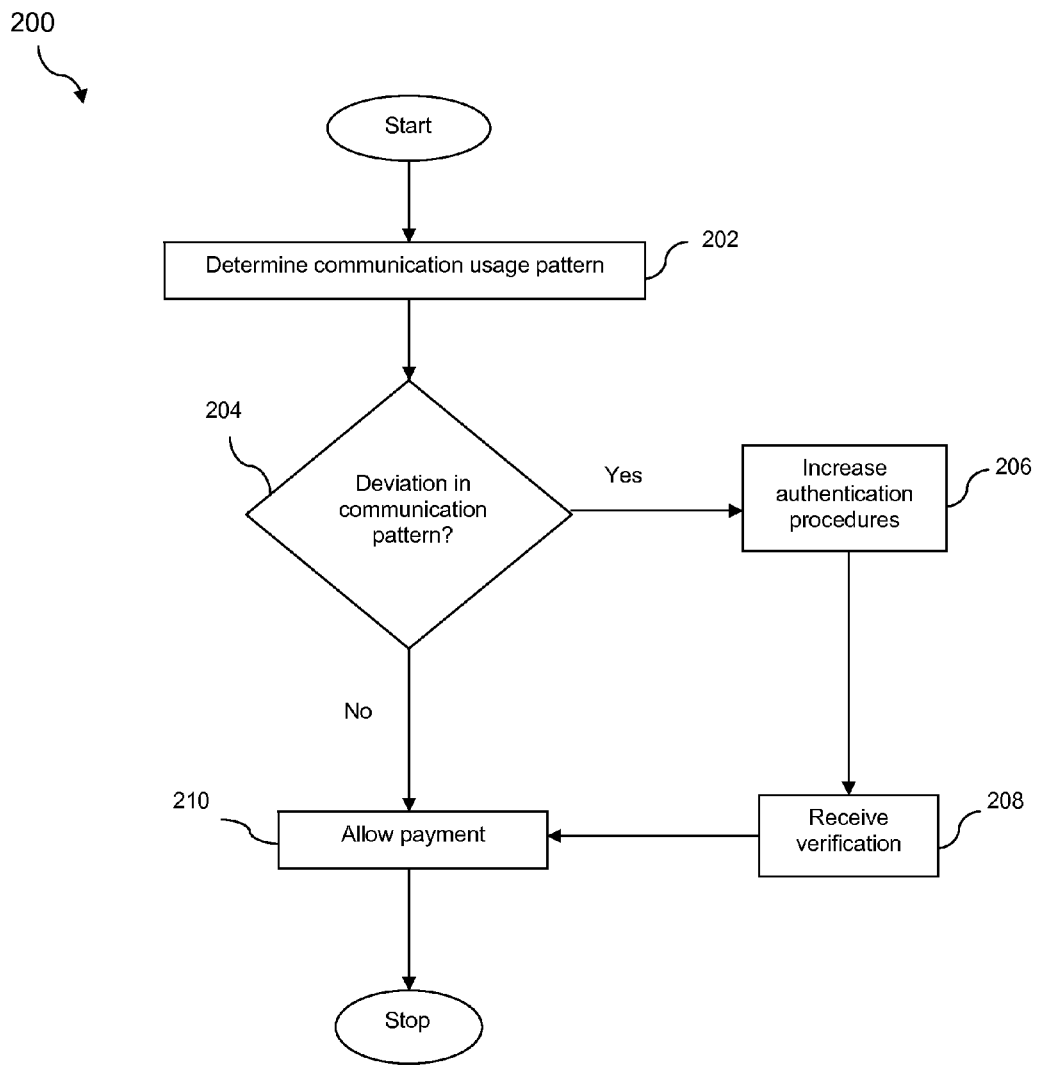
FIG. 2 is a flowchart of a method of reducing electronic credit card fraud according to an embodiment of the disclosure.

Turning now to FIG. 2, a method 200 of reducing credit card fraud is described. The method 200 begins at block 202 where the communication usage pattern of the electronic mobile device 102 is determined. In an embodiment, the communication usage pattern could be the phone numbers normally called, the times of day the phone numbers are called, the location that the numbers are normally called from, the average number of calls per unit of time, the average length of each call, the average number of incoming/outgoing data packets per unit of time, and/or the average amount of time the mobile electronic device 102 is out of network coverage or turned off. In an embodiment, the averages may be calculated over a window of time, for example an average over the most recent seven days of communication, an average determined over the most recent month of communication, or an average determined over some other effective window of time. In some contexts this may be referred to as a window average or a sliding window average. The usage pattern information may be recorded by the service provider 110 and stored in the usage database 116.

In block 204, the fraud detection application 114 in the computer 112 may analyze the communication usage patterns to determine if there is a deviation in the communication usage patterns of the mobile electronic device 102. A deviation in a usage pattern could be when the number of voice calls during a unit of time falls outside of a pre-defined range for the normal number of voice calls per unit of time, when the number of incoming/outgoing data packets during a unit of time falls outside of the pre-defined normal range for the number of incoming/outgoing number of data packets during a unit of time, when the duration of voice calls falls outside of a pre-defined range for the normal duration of voice calls, or when the length of time the mobile electronic device 102 is out of network coverage is significantly longer than a pre-defined amount of time the mobile electronic device is normally out of network coverage. In an embodiment, the normal ranges of communications activities may be defined with reference to an average level of communications activities.

If no deviation in communication usage patterns exist, the method proceeds to block 210 and payment by the electronic credit card 104 in the mobile electronic device 102 is allowed. If in block 204, the fraud detection application 114 determines a deviation in communication usage, the method 200 triggers the activation of block 206 wherein authentication procedures are increased. Increasing authentication procedures could be requiring input of a personal identification number or requiring a photo identification when the electronic credit card 104 in the mobile electronic device 102 is used to make a purchase at the point-of-sale terminal 126. In block 208, if the user of the mobile electronic device 102 presents a valid photo identification or enters the personal identification number at the point-of-sale terminal 126, the method moves to block 210 wherein the payment by the electronic credit card 104 in the mobile electronic device 102 is allowed.

Figure 3:
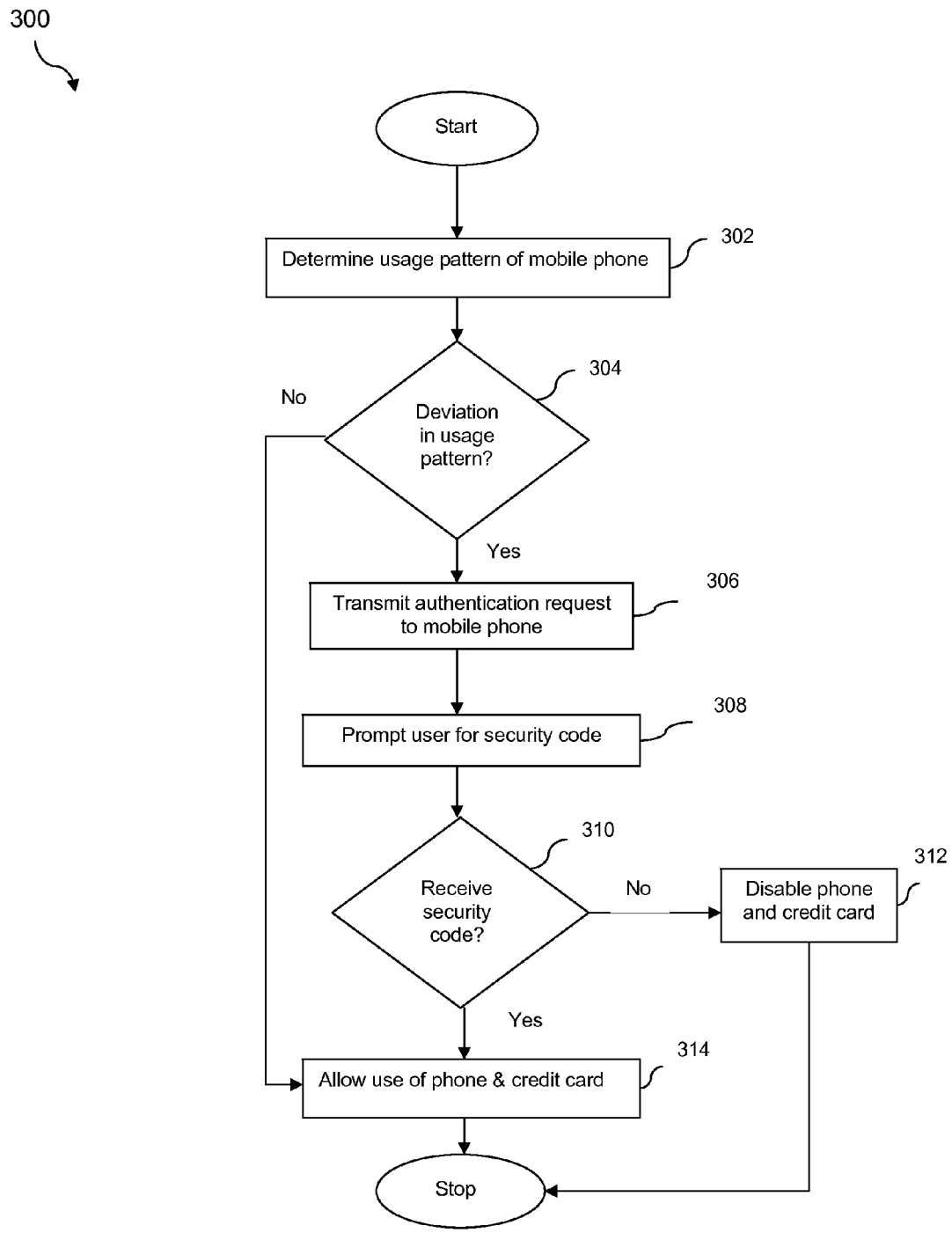
FIG. 3 is a flowchart of a method of preventing identity theft according to an embodiment of the disclosure.

Turning now to FIG. 3, a method 300 of discretely preventing identity theft is described. The method 300 begins at block 302 where the communication usage pattern of the electronic mobile device 102 is determined by analyzing call detail records stored in the usage database 116. The mobile electronic device 102 in the method 300 is hereinafter referred to as a mobile phone 102. A communication usage pattern could be the phone numbers normally called, the times of day the phone numbers are called, the location that the numbers are normally called from, the average number of calls per unit of time, the average length of each call, the average number of incoming/outgoing data packets per unit of time, and/or the average amount of time the mobile phone 102 is out of network coverage or turned off. The usage pattern information may be recorded by the service provider 110 and stored in the usage database 116.

In block 304, the fraud detection application 114 in the computer 112 may analyze the communication usage patterns to determine if there is a significant deviation in the communication usage patterns of the mobile phone 102. A deviation in a usage pattern could be when the number of voice calls during a unit of time falls outside of the pre-defined range for the number of voice calls per unit of time, when the number of incoming/outgoing data packets during a unit of time falls outside of a pre-defined range for the number of incoming/outgoing number of data packets during a unit of time, when the duration of voice calls falls outside of a pre-defined range for the length of voice calls, and/or when the length of time the mobile phone 102 is out of network coverage is significantly longer than a pre-defined normal amount of time that the mobile phone 102 is out of network coverage. A deviation in a usage pattern could also be determined by an absence of calls to specific numbers which may be customarily called at periodic intervals. A deviation in a usage pattern could be determined based on a type of data being accessed by the mobile phone 102 that is different from the customary data that the mobile phone 102 accesses, for example data accessed from different universal reference locators. A deviation in a usage pattern could be determined by use of a different data communication protocol. A deviation in a usage pattern could be determined by a change in destinations for sending data from the mobile phone 102.

If in block 304, the fraud detection application 114 determines a deviation in communication usage (e.g., the mobile electronic device is determined to be in a different country), the method proceeds to block 306 wherein the fraud detection application 114 may transmit an authentication request, via a text message or a voice message, that may include a summary of the communication usage pattern deviation. Examples of a summary of a usage pattern may be the location of the mobile phone, the increased/decreased number of calls, the increased/decreased duration of calls, the increased/decreased number of data packets sent/received. Moving to block 308, in response to the authentication request from the fraud detection application 114, a text message on the mobile phone 102 may prompt the user to enter a security code to verify ownership. Alternatively, a voice message on the mobile phone 102 may request an answer to a security question to verify ownership.

In block 310, if the user enters the correct security code in the mobile phone 102, the method proceeds to block 314 wherein phone service and the use of the electronic credit card 104 may continue uninterrupted. If in block 310, no security code is received or the incorrect security code is received, the method moves to block 312 wherein the phone service and the electronic credit card application 104 may be disabled until ownership verification is received.

Figure 4:
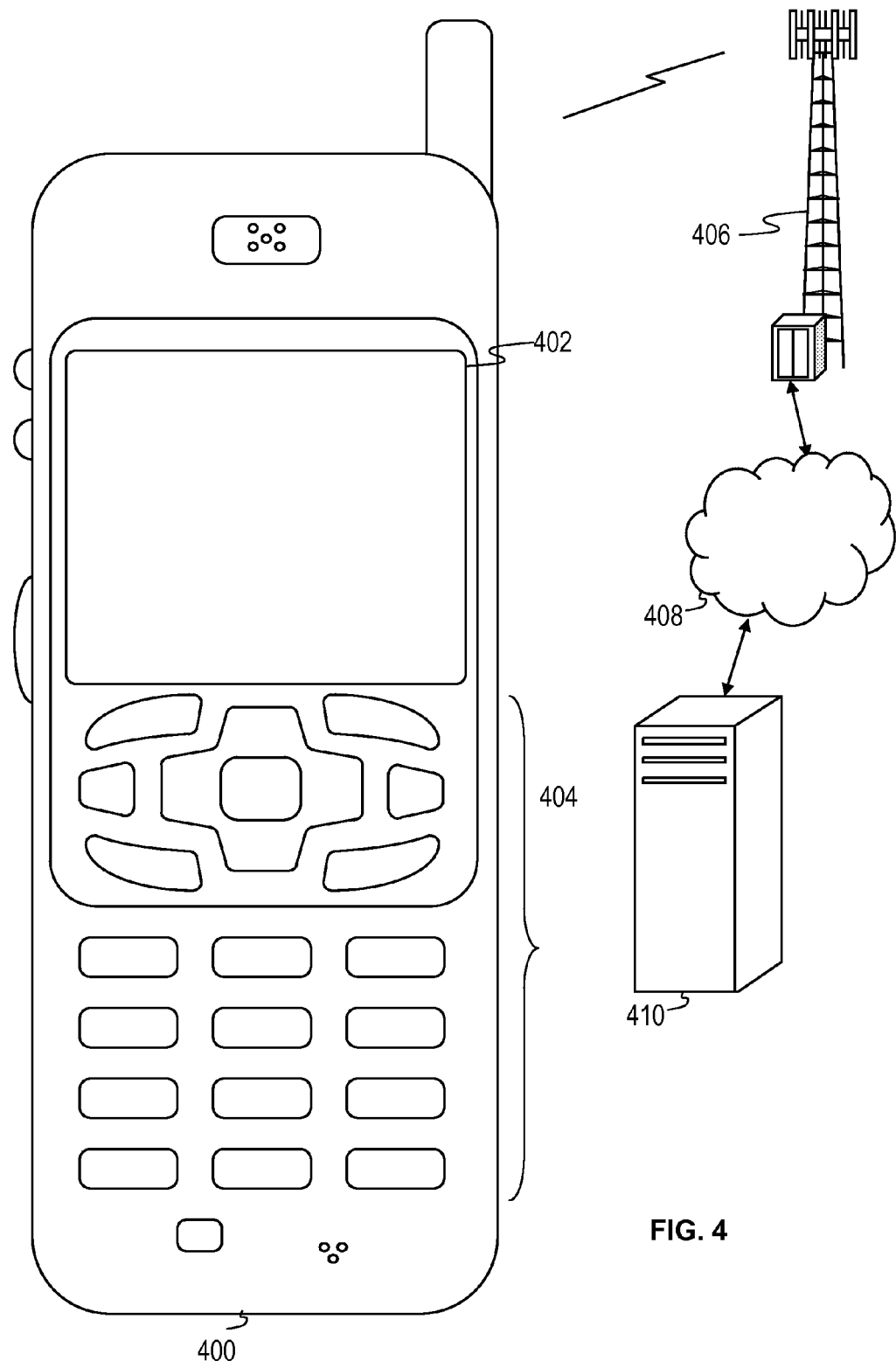
FIG. 4 illustrates a handset suitable for implementing an embodiment of the disclosure.

FIG. 4 shows a wireless communications system including the mobile device 400 which may be similar to the mobile device 102 in FIG. 1. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values to configure the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device.

The mobile device 400 may execute a web browser application which enables the display 402 to show a web page. The web page may be obtained via wireless communications with a base transceiver station (BTS) 406, a wireless network access node, a peer mobile device 400 or any other wireless communication network or system. While a single base transceiver station 406 is illustrated, it is understood that the wireless communication system may comprise additional base transceiver stations. In some instances, the mobile device 400 may be in communication with multiple base transceiver stations 406 at the same time. The base transceiver station 406 (or wireless network access node) is coupled to a wired network 408, such as the internet. Via the wireless link and the wired network, the mobile device 400 has access to information on various servers, such as a server 410. The server 410 may provide content that may be shown on the display 402. Alternately, the mobile device 400 may access the base transceiver station 406 through a peer mobile device 400 acting as an intermediary, in a relay type or hop type of connection.

Figure 5:
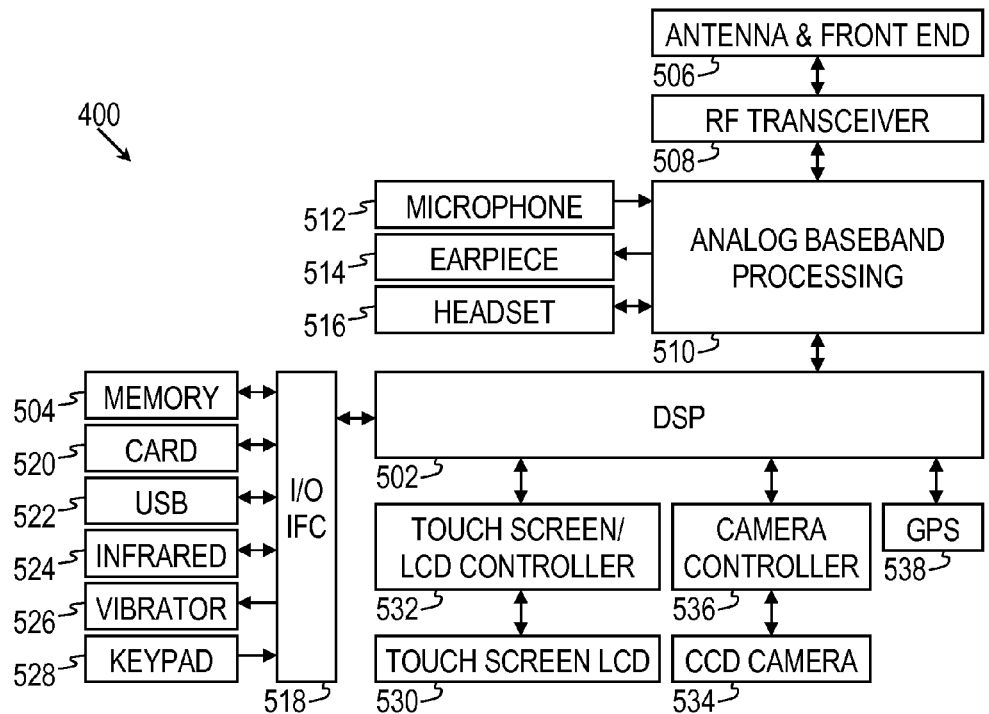
FIG. 5 is a block diagram of a handset suitable for implementing an embodiment of the disclosure.

FIG. 5 shows a block diagram of the mobile device 400. While a variety of known components of handsets 400 are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the mobile device 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide internet connectivity to enable a user to gain access to content on the internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526, so that when triggered, causes the mobile device 400 to vibrate. The vibrator 526 may serve as a mechanism to silently alert the user to any of various events (e.g., an incoming call, a new text message, an appointment reminder).

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions such as radio and television reception.

Figure 6:
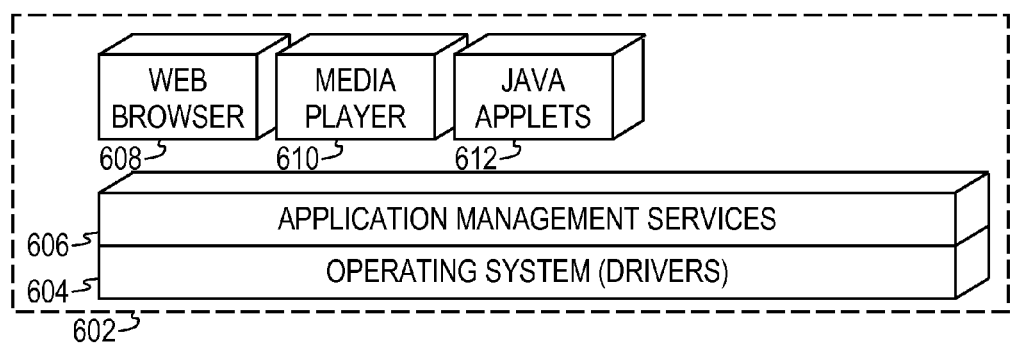
FIG. 6 is a block diagram of a software architecture of a handset suitable for implementing an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the mobile device 400. Also shown in FIG. 6 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 7:
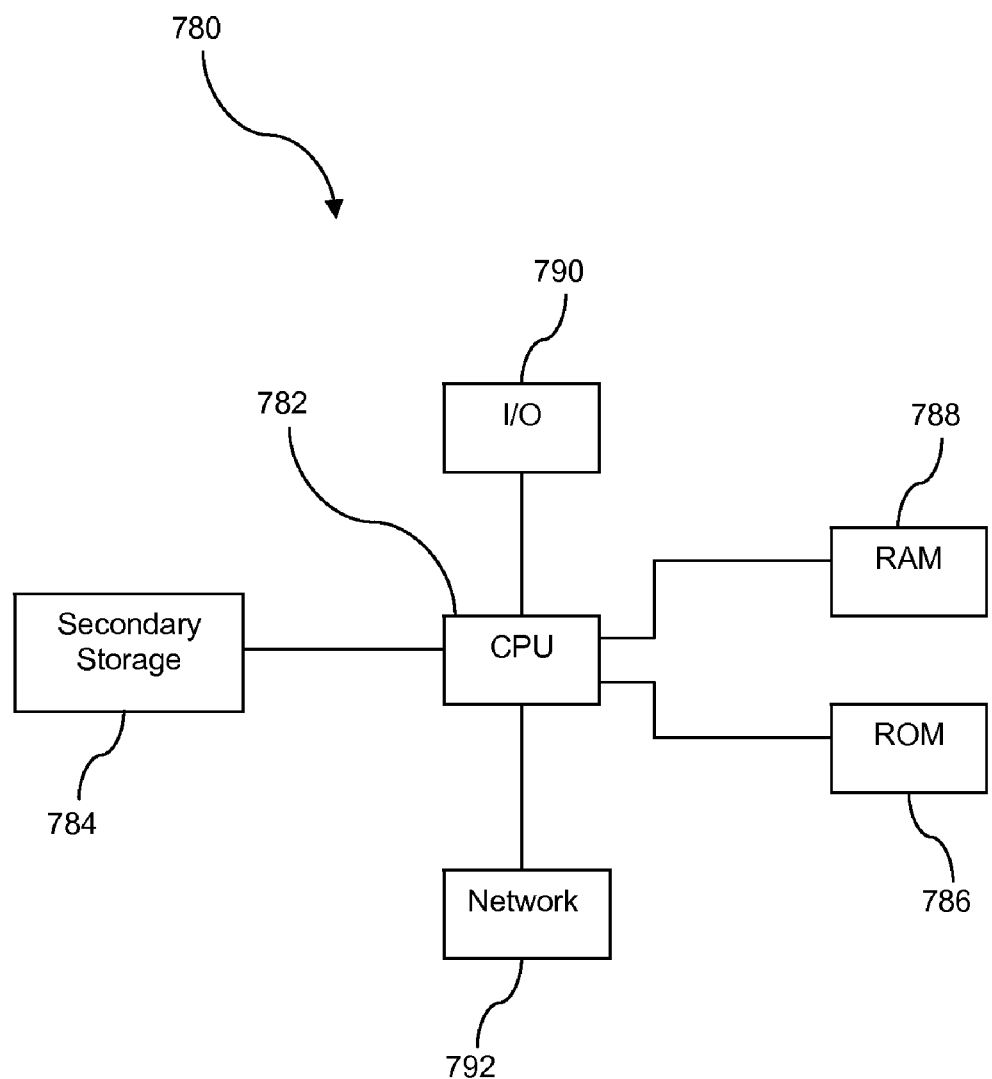
FIG. 7 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used to store non-volatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 382 to communicate with an internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embedded in the carrier wave may be sequenced differently as desired for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A credit card fraud reduction system, comprising:
   a computer system; and
   an application that, when executed on the computer system, applies increased credit card fraud prevention procedures to use of an electronic credit card application in a mobile electronic device at the time of or prior to a payment transaction at a point-of-sale terminal in response to a changed communication usage pattern of the mobile electronic device.

2. The system of claim 1, wherein the mobile electronic device is one of a mobile phone, a personal digital assistant, a media player, a laptop computer, and a tablet computer.

3. The system of claim 1, wherein the usage pattern comprises a pattern of called phone numbers and browsed universal reference locators (URLs).

4. The system of claim 3, wherein the pattern of called phone numbers is based on days of the week and times of day the phone numbers are called and the pattern of browsed universal reference locators is based on days of the week and times of day the universal reference locators are browsed.

5. The system of claim 3, wherein the usage pattern further comprises at least one of an average number of voice calls per unit of time, an average length of voice call, an average number of outgoing data packets per unit of time, an average number of incoming data packets per unit of time, and an average length of time the mobile electronic device is out of network coverage.

6. The system of claim 1, wherein the increased credit card fraud prevention procedures comprise requiring the entry of secure information into the mobile electronic device.

7. The system of claim 1, wherein the communication usage pattern is based on analysis of call detail records produced by a mobile phone service provider.

8. A method of reducing credit card fraud, comprising:
   determining, by a fraud detection application stored on a non-transitory computer readable medium and executable by a processor, a communication usage pattern of a mobile electronic device, wherein the mobile electronic device contains an electronic credit card application;
   identifying, by the fraud detection application, communication from the mobile electronic device that deviates from the communication usage pattern as a trigger event; and
   at the time of or prior to a payment transaction at a point-of-sale terminal and in response to the trigger event, increasing authentication procedures to complete the payment transaction using the electronic credit card application on the mobile electronic device.

9. The method of claim 8, wherein the communication usage pattern is at least one of an average number of voice calls per unit of time, an average length of voice call, an average number of outgoing data packets per unit of time, an average number of incoming data packets per unit of time, and an average length of time the mobile electronic device is out of network coverage.

10. The method of claim 9, wherein the trigger event is identified when one of the number of voice calls during a unit of time drops below the average number of voice calls per unit of time, the average length of voice call determined over a pre-defined number of voice calls drops below the average length of voice call, the number of outgoing data packets during a unit of time drops below the average number of outgoing data packets per unit of time, and the number of incoming data packets during a unit of time drops below the average number of incoming data packets per unit of time.

11. The method of claim 9, wherein the trigger event is identified when one of the number of voice calls during a unit of time is above the average number of voice calls per unit of time, an average length of voice call determined over a pre-defined number of voice calls is above the average length of voice call, the number of outgoing data packets during a unit of time is above the average number of outgoing data packets per unit of time, and the number of incoming data packets during a unit of time is above the average number of incoming data packets per unit of time.

12. The method of claim 8, wherein increasing authentication procedures comprises at least one of requiring entry of a personal identification number to complete payment transactions and requiring presentation of photo identification to complete payment transactions.

13. The method claim 8, further including transmitting an authentication request to the mobile electronic device after the trigger event and asynchronously with respect to a payment transaction using the electronic credit card application on the mobile electronic device.

14. A method of discrete identity theft prevention, comprising:
   determining, by a fraud detection application stored on a non-transitory computer readable medium and executable by a processor, a usage pattern of a mobile phone, wherein the usage pattern is based on voice communications and data communications, and wherein the mobile phone contains an electronic credit card application;
   identifying, by the fraud detection application, a usage pattern deviation from the usage pattern of the mobile phone;
   at the time of or prior to a payment transaction at a point-of-sale terminal and in response to the usage pattern deviation, transmitting, by the fraud detection application, an authentication request to the mobile phone; and
   at the time of or prior to the payment transaction at the point-of-sale terminal and in response to the authentication request, the mobile phone prompting a user for input of a security code.

15. The method of claim 14, wherein determining the usage pattern of the mobile phone is based at least in part on analysis of call detail records (CDRs).

16. The method of claim 14, further including transmitting a text message to the mobile phone, wherein the text message summarizes the usage pattern deviation.

17. The method of claim 14, further including transmitting an automated voice message to the mobile phone, wherein the automated voice message summarizes the usage pattern deviation.

18. The method of claim 14, wherein the usage pattern deviation comprises at least one of reduced number of calls per unit time, increased number of calls per unit time, reduced call duration, increased call duration, reduced number of data packets per unit time, and increased number of data packets per unit time.

19. The method of claim 14, wherein the usage pattern deviation comprises at least one of voice calls originated from the mobile phone from non-customary locations and data calls originated from the mobile phone from non-customary locations.

20. The method of claim 14, further including disabling the mobile phone and the electronic credit card application when at least one of the incorrect security code and no security code is entered by the user.

* * * * *